United States Patent [19]

Edwards et al.

[11] Patent Number: 5,104,691
[45] Date of Patent: Apr. 14, 1992

[54] EPOXY RESIN SYSTEM FOR INSITU REHABILITATION OF PIPES

[75] Inventors: Granville D. Edwards; Bonita S. Wilson, both of Houston, Tex.

[73] Assignee: Shell Oil Company, Houston, Tex.

[21] Appl. No.: 764,742

[22] Filed: Sep. 24, 1991

Related U.S. Application Data

[62] Division of Ser. No. 530,771, May 30, 1990.

[51] Int. Cl.$^5$ .............................................. B05D 3/02
[52] U.S. Cl. ................................... 427/140; 427/230; 427/336; 427/386
[58] Field of Search ............... 427/140, 230, 336, 368

[56] References Cited

U.S. PATENT DOCUMENTS

| | | | |
|---|---|---|---|
| 3,945,972 | 3/1976 | Sakamoto | 260/47 |
| 4,009,063 | 2/1977 | Wood | 156/71 |
| 4,064,211 | 12/1977 | Wood | 264/95 |
| 4,110,313 | 8/1978 | Schulze et al. | 528/94 |
| 4,135,958 | 1/1979 | Wood | 156/199 |
| 4,146,700 | 3/1979 | Waddill et al. | 528/94 |
| 4,331,582 | 5/1982 | Babayan | 528/94 |
| 4,528,308 | 7/1985 | Waddill | 523/466 |
| 4,529,537 | 7/1985 | Dockner et al. | 528/94 |
| 4,758,454 | 7/1988 | Wood | 428/36 |
| 5,017,258 | 5/1991 | Brown et al. | 427/230 |

FOREIGN PATENT DOCUMENTS 145654 6/1985 European Pat. Off. .
57-92019 8/1982 Japan .

OTHER PUBLICATIONS

Lee & Neville, Epoxy Resins, pp. 223-224.

*Primary Examiner*—Michael Lusignan

[57] ABSTRACT

An epoxy resin/curing agent composition is provided comprising (i) at least one liquid epoxy resin, (ii) a reactive epoxy-functional diluent, (iii) a thixotroping agent, (iv) a polyamide resin, (v) a polyalkylenediamine, and (vi) 2-ethyl-4-methyl imidazole or derivatives thereof. The composition is suitable for use in in situ coating and rehabilitation processes and can withstand service at elevated temperatures.

12 Claims, No Drawings

EPOXY RESIN SYSTEM FOR INSITU REHABILITATION OF PIPES

This is a division of application Ser. No. 07/530,771, filed May 30, 1990.

BACKGROUND OF THE INVENTION

This invention relates to an epoxy resin composition for in situ rehabilitation of pipes. In a specific aspect, the invention relates to an epoxy resin/curing agent composition suitable for use in the rehabilitation of pipes which carry high-temperature fluids.

Underground fluid-transporting pipes fracture and corrode with use and age. Repair of a leaking pipe can involve time-consuming and expensive excavation and replacement of the damaged pipe. Excavation of a length of pipe is particularly difficult if the pipe is located in areas where the ground is frozen for long periods of time or if the pipe is located directly beneath a highway or large structure. Techniques have been developed for repairing underground pipe without excavation. These techniques generally involve the saturation of a liner with a thermosettable resin, placement of the saturated liner against the inner surface of the pipe, and cure of the resin to form a hard inner pipe within and adhering to the original pipe.

Both polyester resins and epoxy resins have been used in such in situ pipe rehabilitation processes. Epoxy resins have the advantage of being less susceptible to shrinkage during the cure process. An epoxy resin formulation used in such a process must meet very demanding requirements in addition to resistance to shrinkage with cure. The curing agent used in the formulation must not be water-sensitive, as water is usually present in the pipe or the exterior environment, and the system must not generate so much heat during the cure process as to embrittle or burn the cured resin. Epoxy formulations containing curing agents have been developed which overcome such problems inherent in in situ pipe rehabilitation. However, such systems are not adequate, and may degrade, for repairing pipelines which transport fluids at temperatures above about 65° C., such as hot water or hot process chemicals.

It is therefore an object of the invention to provide an epoxy-based formulation for in situ rehabilitation of pipelines in service at elevated temperatures and/or under corrosive conditions.

BRIEF SUMMARY OF THE INVENTION

According to the invention, there is provided an epoxy resin composition comprising (i) at least one liquid epoxy resin, (ii) a reactive diluent, (iii) a thixotroping agent, (iv) a polyamide resin, (v) a polyalkylenediamine, and (vi) 2-ethyl-4-methyl imidazole or derivatives thereof. The composition can be used in in situ coating and rehabilitation processes and can withstand service at elevated temperatures.

DETAILED DESCRIPTION OF THE INVENTION

It has been found that an epoxy resin system which is suitable for rehabilitating pipes for continuous service at higher temperatures, up to about 93° C., can be obtained by the use of liquid epoxy resin in combination with a curing agent comprising a polyamide resin, a polyoxyalkylenediamine, and 2-ethyl-4-methyl imidazole or derivatives thereof.

In general, polyamide resins can be any liquid polyamide resin, preferably having viscosity in the range of about 2.5 to about 4.5 poise at 75° C. and amine equivalent weight of about 370 to about 400. Suitable polyamide resins include polyamines formed by reacting $C_{34}$ dimerized fatty acid with a stoichiometric excess of aliphatic diprimary polyamines such as diethylene triamine, triethylene tetramine, tetraethylene pentaamine, for example: A commercial example of a suitable polyamide resin includes EPON ® Curing Agent V-40, a product of Shell Chemical Company.

Suitable polyoxyalkylenediamines generally have a polyether backbone based either on propylene oxide or ethylene oxide or mixtures of the two. The preferred polyoxyalkylenediamines have the general structure:

$$H_2NCH(CH_3)CH_2[OCH_2CH(CH_3)]_xNH_2$$

wherein x is a finite number such that the number average molecular weight of the polyoxyalkylenediamine is from about 350 to about 450. A commercial example of suitable polyoxyalkylenediamines includes polyoxypropylenediamine sold by Texaco under the trademark JEFFAMINE.

The curing agent will further contain 2-ethyl-4-methyl imidazole, derivatives of 2-ethyl-4-methyl imidazole such as cyanohydrin derivatives of 2-ethyl-4-methyl imidazole (e.g., 1-cyanoethyl-2-ethyl-4-methylimidazole), or mixtures thereof. 2-ethyl-4-methyl imidazole is preferred because of its slow reactivity with epoxies at low temperature and suitably fast reactivity at cure temperatures.

The curing agent preferably contains from about 35 to about 55 weight percent of 2-ethyl-4-methyl imidazole, most preferably 40 to about 50 weight percent, based on the weight of the curing agent. The amine component of the curing agent preferably contains from about 30 to about 50 weight percent of polyoxyalkylenediamine, based on the weight of polyamine and polyoxyalkylenediamine. The ratio of the components may vary so long as the resulting viscosity of the curing agent permits convenient handling in the intended application, preferably within the range of about 8 to about 16 poise at 25° C. For the invention composition, in addition to a high heat deflection temperature, which is important in forming pipes for service at elevated temperatures, it is important that the viscosity of the resulting components are within the range so the flow of the components will be suitable for use in insitu processes. Typically, the components of the curing agent are blended under a nitrogen blanket for approximately 40 minutes at about 37° C. to about 44° C.

In addition to forming pipe for service at elevated temperatures, it is important that the viscosity of the epoxy resin/curing agent composition be sufficiently low to allow rapid impregnation of a liner support material and that it, be slow reacting at lower temperatures of about 25° C. to about 30° C. If the flow of the resulting resin/curing agent mix is not in the proper range, the supporting fibers in the liner will not wet properly. The mix must be free flowing and wet the fibers in the shortest period of time in order to retain the maximum amount of time for placing the liner inside the old pipe before the chemical reaction of the resin and curing agent causes the liner to become stiff. The resulting mixture must also cure within a reasonably short time using heat supplied by heated water. A unique feature of the invention is the relatively low curing temperature of the composition compared with its service temperature. The mixture can be cured at about 83° C., while the cured epoxy resin composition develops sufficient physical properties to be placed in service at temperatures up to about 93° C. The cured composition has a heat deflection temperature of about 132° C. Most epoxy resin systems must be post-cured above their heat deflection temperature to develop suitable properties for high-temperature applications.

The polyamine and polyoxyalkylenediamine components in the curing agent are also important to increase flexibility and to impart early partial cure to the resulting resin/curing agent mix. The early partial cure starts the curing reaction at a lower temperature, which results in better adhesion between the polymeric membrane coating on the fibers in the liner and the cured epoxy resin matrix.

Epoxy resins suitable for the invention composition are any liquid epoxy resins, provided that they have an epoxide equivalent weight within the range of about 165 to about 195. Epoxy resins will generally have starting viscosities within the range of about 30 to about 130 poise at 25° C. Epoxy resins which have resin viscosities of less than 70 poise are most preferred in order to impregnate fibers readily. Preferably the epoxy resin is a diglycidyl ether of a dihydric phenol. Diglycidyl ethers of dihydric phenols can be produced, for example, by reacting an epihalohydrin with a dihydric phenol in the presence of an alkali. Examples of suitable dihydric phenols include: 2,2-bis(4-hydroxyphenyl) propane (bisphenol-A); 2,2-bis(4-hydroxy-tert-butylphenyl) propane; 1,1-bis(4-hydroxyphenyl) ethane; 1,1-bis(4-hydroxyphenyl) isobutane; 2,2-bis(4-hydroxytertiary-butylphenyl) propane; bis(2-hydroxynapthyl) methane; 1,5-dihydroxynaphthalene; 1,1-bis(4-hydroxy-3-alkylphenyl) ethane and the like. The preferred dihydric phenol is bisphenol-A. Suitable dihydric phenols can also be obtained from the reaction of phenol with aldehydes such as formaldehyde (bisphenol-F). A commercial example of such a diglycidyl ether is EPON ® Resin DPL-862, a product of Shell Chemical Company. Commercial examples of preferable epoxy resins include EPON ® Resin 828, EPON ® Resin 826, and EPON ® Resin 825, products of Shell Chemical Company which are diglycidyl ethers of 2,2-bis(4-hydroxyphenyl)propane having number average molecular weights within the range of about 340 to about 400. The epoxy resin can be a mixture of these resins. The currently preferred epoxy resin includes a mixture of diglycidyl ethers of bisphenol-A and bisphenol-F because of the reduced tendency of such a mixtue to crystallize when stored.

The epoxy resin component preferably contains a minor amount of a reactive diluent. The diluent should have more than an average of about one reactive group per molecule, and preferably should have a viscosity within the range of about 0.5 to about 25 poise at 25° C. It is important that this diluent lower the viscosity to a useful range, but that it not lower the heat deflection temperature of the cured resin composition. Suitable reactive diluents include diglycidyl ether of diols such as the diglycidyl ethers of 1,4-butanediol and neopentyl glycol; and diglycidyl ethers of carboxylic acids such as Cardura ® E-10 (glycidyl ester of $C_9$–$C_{11}$ alkyl carboxylic acids sold by Shell Chemical Company). The diglycidyl ether of neopentyl glycol is most preferred because of the superior heat deflection temperature imparted to the cured resin and the desired viscosity range possible in the uncured formulation.

A minor amount of a thixotroping agent can also be present in the epoxy resin composition. Thixotroping agents reduce the tendency of a resin mixture to flow at low shear rates. This is particularly important for holding the resin/curing agent composition in place when the system is heated to its cure temperature. Suitable thixotroping agents include any known silica thixotroping agent. Suitable commercial examples include Cab-O-Sil ® fumed silica, a product of Cabot Corporation.

Typically the thixotroping agent is slowly blended into the epoxy resin at a temperature within the range of about 65° C. to about 72° C. in a high shear mixer. The reactive diluent is blended into the epoxy at temperatures within the range of about 43° C. to about 50° C. The amount of thixotroping agent and reactive diluent will vary depending on the epoxy resins, thixotroping agents or diluents used, as long as the viscosity of the resulting epoxy resin/curing agent mix is within the range of about 25 to about 65 poise at 25° C. and the amount present does not substantially lower the heat deflection temperature of the cured resin. Weight per epoxide of the epoxy resin component, including the epoxy resin, reactive diluent, is preferably within the range of about 160 to about 195. Preferably the thixotroping agent is present within the range of about 0.5 to about 5 weight percent based on the epoxy resin component. Preferably the reactive diluent is present within the range of about 0.1 to about 15 weight percent based on the epoxy resin component.

For the epoxy resin formulation to be useful for the insitu repair of pipes, the formulation should (1) be low enough in viscosity to wet the liner used in the repair in the shortest time possible, preferably from about 25 to about 65 poise, (2) have the correct thixotropic properties to prevent resin run down on heating during the cure cycle, (3) be slow reacting at low temperature to prevent premature gelation, (4) be able to cure below about 83° C. (temperature of heated water), preferably at about 70° C. to about 83° C., and (5) develop suitable physical properties in a few hours. The invention liquid epoxy resin formulations fulfill the above requirements, when thoroughly mixed at about 100 parts of the resin component to about 6 to about 12 parts, preferably about 8 to about 11 parts, of the curing agent. The term "liquid" means normally liquid at ambient temperature and pressure.

The epoxy resin component and the curing agent should be brought to a temperature of about 24° C. to about 27° C. prior to mixing. Mixing time will typically be about 10 to about 20 minutes depending on the efficiency of the mixer. If the mix is low in temperature, it will be thick and will not wet out a liner efficiently.

Methods for lining a pipe or a passageway with a hard liner are taught, for example, in U.S. Pat. Nos. 4,009,063; 4,064,211; 4,135,958 and 4,758,454, the disclosure of which are herein incorporated by reference. The liners are generally a laminate of nonwoven felt coated with a plastic sheet material as a membrane. The felt fibers are impregnated with an uncured resin/curing agent mix. The felt acts as a carrier for the resin mix and keeps the resin in a convenient form until it is cured. The impregnated liner is turned inside out along the passageway inside a pipe using fluid pressure. When the resin is cured, the fibrous layer impregnated with resin forms a rigid shell inside the pipeline or passageway, defining a smooth inner surface to the lining.

Suitable felt fibers to act as a support for the epoxy resin systems, for example, can be composed of polyester or glass fibers. The felt is typically coated on one side with a thin layer of a thermoplastic coating (membrane). The membrane holds the resin/curing agent composition inside the impregnated felt and prevents water from contacting the resin mixture during a hot water cure. The membrane typically is a single layer such as polyurethane, for example, but can be composed of several layers. The first layer can be a bonding layer between the fibers and the second layer, which optionally can be a barrier film such as ethylene vinyl alcohol. The bonding layer, for example, can be an ionomer such as Surlyn polymer (a polyethylene copolymer that is lightly crosslinked via interchain ionic bonds with metallic acrylates). An outer film can be a PVC (polyvinyl chloride) film, a urethane film such as polyurethane or Surlyn polymer. Surlyn is preferred because of the lower water permeability. Optionally, the membrane can be removed once the epoxy resin system is cured.

The felt is impregnated with the epoxy resin/curing agent mix immediately prior to use. Working life of the liner can be extended to more than 2 days if packed in ice. For a 9 mm thick liner, the epoxy resin mix of the invention is typically cured in a cure cycle of about one hour at about 50° C., about one hour at about 70° C., and about four to five hours at about 83° C., to produce a crosslinked resin matrix with a heat deflection temperature of about 132° C., which corresponds to service temperature of up to about 93° C. Depending on the heat applied, the resin matrix may not be completely cured until the pipe is placed in service at elevated temperature, which will further cure the resin matrix. Heat can be supplied by any method that enables circulation of heat through a pipe, such as hot water, steam or hot air. Hot water is preferred because of ease of controlling the temperature of the system. The cured composite liner should be cooled slowly at a rate of about 5° C. per hour or less in order to relieve residual stresses. The cured composite from the invention epoxy resin formulation retains good physical properties at temperatures up to about 93° C.

EXAMPLE 1

This example demonstrates preparation of an epoxy resin composition according to the invention. Table 1 below describes the epoxy resin component of the compositions.

The epoxy resin composition of run 1 was prepared as follows: 800 grams of the diglycidyl ether of 2-2-bis(4-hydroxyphenyl)propane (liquid epoxy resin) having a weight per epoxy in the range of about 175 to about 185 and viscosity of about 60 to about 70 poise were placed in a metal quart container and heated to 71° C. 8 grams of Cab-O-Sil M-5 (available from Cabot Corp.) were slowly added to the liquid epoxy resin while mixing at a high shear rate. After the mixture was cooled to about 45° C., 40 grams of neopentyl glycol glycidyl ether were blended in with a stirrer attached to an air motor using a lower rate of shear. The resulting resin blend was then poured into a glass quart jar and left to cool to room temperature and to allow entrained air bubbles to escape.

The epoxy resin composition of run 2 was prepared as follows: 500 grams of the diglycidyl ether of 2,2-bis(4-hydroxyphenyl)propane (liquid epoxy resin) having a weight per epoxy in the range of about 175 to about 185 and viscosity of about 60 to about 70 poise at 25° C. were placed in a metal quart container and heated to 71° C. 5 grams of Cab-O-Sil M-5 (available from Cabot Corp.) were slowly added to the liquid epoxy resin while mixing at a high shear rate. After the mixture was cooled to about 45° C., 25 grams of Epoxide 8 ($C_{12}$–$C_{14}$ alkyl glycidyl ether available from Shell Chemical Co.) were blended in with a stirrer attached to an air motor using a lower rate of shear. The resulting resin blend was then poured into a glass quart jar and left to cool to room temperature and to allow entrained air bubbles to escape.

Run 3 was prepared in a similar manner to run 2, except 500 grams of the diglycidyl ether of 2,2-bis(4-hydroxyphenyl)propane having a weight per epoxy in the range of about 180 to about 195 and viscosity of about 110 to about 150 poise at 25° C., 40 grams of Epoxide 8 and 8 grams of Cab-O-Sil M-5 were used.

Run 5 was prepared in a similar manner to run 1, except 500 grams of the diglycidyl ether of 2,2-bis(4-hydroxyphenyl)propane having a weight per epoxy in the range of about 172 to about 178 and viscosity of about 40 to about 60 poise at 25° C., 25 grams of neopentyl glycol glycidyl ether and 7.5 grams of Cab-O-Sil were used.

Run 6 was prepared in a similar manner to run 1, except 500 grams of the diglycidyl ether of 2,2-bis(4-hydroxyphenyl)propane having a weight per epoxy in the range of about 180 to about 195 and viscosity of about 100 to about 150 poise at 25° C., 25 grams of neopentyl glycol glycidyl ether and 5 grams of Cab-O-Sil were used.

Properties of these epoxy resin components are shown in Table 1 below.

TABLE 1

| Resin Composition, % Weight | 1 | 2 | 3 | 4 | 5 | 6 |
|---|---|---|---|---|---|---|
| Liquid Epoxy Resin* | 94.3 | 94.3 | 91.0[1] | 100.0 | 93.9[2] | 94.3[1] |
| Diglycidyl Ether NPG | 4.7 | — | — | — | 4.7 | 4.7 |
| Epoxide 8 | — | 4.7 | 8.0 | — | — | — |
| Cab-O-Sil | 1.0 | 1.0 | 1.0 | — | 1.4 | 1.0 |
| Properties | | | | | | |
| Epoxy Equivalent Weight | 178 | 187 | 195 | 178 | 178 | 189 |
| Viscosity, cp @ 25° C. | 3,950 | 3,870 | 4,500 | 7,150 | 7,600 | 7,650 |

*diglycidyl ether of 2,2-bis(4-hydroxyphenyl)propane having a weight per epoxy in the range of about 175 to about 185.
[1]weight per epoxy in the range of about 180 to about 195.
[2]weight per epoxy in the range of about 172 to about 178.

Compositions from run 1 and 5 have suitable mix viscosities and excellent heat deflection temperature as indicated in run A and run D in Example 4 (see Table 4). Run 4, without the diluent, is too viscous and results in very viscous mix as indicated in run E, which did not wet the liner properly. The comparative example, run 2 has suitable viscosity, but the Epoxide 8 diluent lowers the heat deflection temperature of the resulting laminates as shown in Example 4 run B.

EXAMPLE 2

This example demonstrates preparation of an epoxy resin composition according to the invention containing Cardura ® E10 as the reactive diluent in place of neopentyl glycol glycidyl ether. Table 2 below describes the compositions of epoxy resin components. Properties of the compositions are listed in Table 2.

The epoxy resin composition of run 1 was prepared as described in Example 1 run 2.

The epoxy resin composition of run 2 was prepared as follows: 500 grams of the diglycidyl ether of 2-2-bis(4-hydroxyphenyl)propane (liquid epoxy resin) having a weight per epoxy in the range of about 175 to about 185 and viscosity of about 60 to about 70 poise were placed in a metal quart container and heated to 71° C. 5 grams of Cab-O-Sil M-5 (available from Cabot Corp.) were slowly added to the liquid epoxy resin while mixing at a high shear rate. After the mixture was cooled to about 45° C., 25 grams of Cardura ® E10 (glycidyl ether of $C_9$–$C_{11}$ alkyl carboxylic acids available from Shell Chemical Company) were blended in with a stirrer attached to an air motor using a lower rate of shear. The resulting resin blend was then poured into a glass quart jar and left to cool to room temperature and to allow the air bubbles to escape.

The epoxy resin composition of run 3 was prepared in a similar manner to run 2, except 15 grams of Cardura ® E10 was blended into the mixture.

The epoxy resin composition of run 4 was prepared in a similar manner to run 3, except a liquid epoxy resin (diglycidyl ether of 2-2-bis(4-hydroxyphenyl)propane) having a weight per epoxy in the range of 172 to about 178 and viscosity of about 40 to about 60 poise at 25° C. was used.

Properties of these epoxy resin components are shown in Table 2 below.

TABLE 2

| Resin Composition, % Weight | 1 | 2 | 3 | 4 |
| --- | --- | --- | --- | --- |
| Liquid Epoxy Resin* | 94.3 | 94.3 | 96.0 | 96.0[1] |
| Epoxide 8 | 4.7 | — | — | — |
| Cardura ® E-10 | — | 4.7 | 3 | 3 |
| Cab-O-Sil | 1.0 | 1.0 | 1.0 | 1.0 |
| Properties | | | | |
| Epoxy Equivalent Weight | 187 | 186 | 184 | 182 |
| Viscosity, cp @ 25° C. | 3,870 | 5,010 | 5,900 | 3,660 |

*diglycidyl ether of 2,2-bis(4-hydroxyphenyl)propane having a weight per epoxy in the range of about 175 to about 185.
[1]weight per epoxy in the range of about 172 to about 178.

The viscosity of the resulting epoxy resin mix is too high in Table 2 run 3 as indicated by the high mix viscosity in Example 4 run K (Table 4). A mix viscosity at 8,920 cps is too viscous to wet a felt liner properly. Run 4, containing a lower viscosity liquid epoxy resin and Cardura ® E-10 diluent provides for a suitable mix with proper viscosity and a good heat deflection temperature as shown in Example 4 run L.

EXAMPLE 3

Table 3 below describes the composition of the curing agent component. The curing agent composition of run 1 was prepared as follows: 60 grams of polyamine resin composed primarily from polyamine resin with 5 to about 10% ethylene amines formed by reacting $C_{34}$ dimerized fatty acid with a stoichiometric excess of ethylene amines including triethylenentetraamine and 40 grams of polyoxypropylenediamine having an average molecular weight of approximately 400 and 80 grams of 2-ethyl-4-methyl imidazole were placed into a 8 ounce glass jar and mixed with a spatula. The jar was then sealed and placed on a sample roller for approximately 2 hours.

Run 2 was prepared in a similar manner to run 1, except without the imidazole. 120 grams of polyamine resin and 80 grams of polyoxypropylenediamine were used.

Run 4 was prepared in a similar manner to run 1, except 80 grams of 2-propyl imidazole were used instead of 2-ethyl 4-methyl imidazole.

TABLE 3

| Curative Composition, % Weight | 1 | 2 | 3 | 4 |
| --- | --- | --- | --- | --- |
| 2-ethyl 4-methyl imidazole | 44.5 | — | 100.0 | — |
| 2-propyl imidazole | — | — | — | 44.5 |
| Jeffamine D-400* | 22.2 | 40.0 | — | 22.2 |
| EPON Curing Agent V-40** | 33.3 | 60.0 | — | 33.3 |
| Properties | | | | |
| Viscosity, cp @ 25° C. | 1,200 | 800 | 13,800 | 700 |
| Amine number, % | 10.5 | 8.0 | 12.0 | 9.5 |

*Polyoxyalkyleneamine available from Texaco
**Polyamide curing agent available from Shell Chemical Company As can be seen from Table 3, 2-ethyl-4-methyl imidazole alone is too viscous at 13,800 cp. The polyamine and polyoxyalkylenediamine lower the viscosity to the proper range at 1,200 cp, indicated by run 1. They also impart flexibility to the cured system and early partial cure. The curative of run 3 by itself is slower to react and requires extended heating at about 83° C. to cure whereas the invention curing agent, run 1, achieves partial cure at about 60° C. within a reasonable time, preferably less than about eight hours. In run 1, partial cure was achieved in about four to five hours at about 60° C. This results in early partial cure and provides improved adhesion of the coating membrane to the resin matrix. The 2-propyl-imidazole curing agent of run 4 does not give the desired heat deflection temperature as shown in Example 4 run F.

EXAMPLE 4

This example demonstrates preparation of a curable epoxy resin composition according to the invention. Table 4 describes the composition containing epoxy resin components from Examples 1 and 2, and curing agent from Example 3.

The following composites plaques were prepared to measure the physical properties. Plaque A was prepared by mixing 400 grams of resin from Run 1, Example 1 with 36 grams of curing agent from run 1, Example 3. A piece of polyester felt was then saturated with the resin curing agent mixture. This felt was then placed in a Teflon ® coated mold and placed in a press set at 10 psi. The plaque was cured for 1 hour at 49° C., 1 hour at 71° C. and 4.5 hours at 83° C. The plaque was then cut and tested for tensile strength according to ASTM method D-638 and flexural strength according to ASTM method D-790 at 25° C. The results are shown below.

| | Physical Properties of Laminate | | | |
| --- | --- | --- | --- | --- |
| | Temperature | | | |
| | 23° C. | 49° C. | 71° C. | 93° C. |
| Strength Retention | | | | |
| Tensile, N/mm$^2$ | 39.0 | 37.0 | 34.1 | 26.3 |
| Flexural, N/mm$^2$ | 61.4 | 59.5 | 55.8 | 49.6 |

-continued

Physical Properties of Laminate

| | Temperature | | | |
|---|---|---|---|---|
| | 23° C. | 49° C. | 71° C. | 93° C. |
| Modulus Retention | | | | |
| Tensile, N/mm$^2$ | 3385 | 2999 | 2613 | 2068 |
| Flexural, N/mm$^2$ | 3723 | 2799 | 2854 | 2208 |

The viscosities were measured immediately after mixing the resin and curing agent. The heat deflection temperatures were determined according to ASTM method D 648-72 using the same cure schedule as that used to prepare the composite plaque.

Runs B-E and I-L were prepared using 200 grams of epoxy resin compositions listed in Table 4 and 18 grams of coresponding curing agents listed in Table 4 in a similar manner to run 1. The properties are shown in Table 4. Runs F and G were prepared in a similar manner, except they were cured for 1 hour at 49° C. and 3 hours at 71° C.

Run H was prepared using 100 grams of the epoxy resin component and 50 grams of the curative listed in Table 4. The test bar was cured for 3 hours at 71° C.

The viscosities and the heat deflection temperature of these samples are shown in Table 4.

TABLE 4

| Composition, % Weight | A | B | C | D | E | F | G | H | I |
|---|---|---|---|---|---|---|---|---|---|
| Resin Component | | | | | | | | | |
| Example 1-1 | 91.7 | — | — | — | — | 91.7 | — | — | — |
| Example 1-2 | — | 91.7 | — | — | — | — | — | — | — |
| Example 1-3 | — | — | 91.7 | — | — | — | 91.7 | 66.7 | — |
| Example 1-4 | — | — | — | — | 91.7 | — | — | — | — |
| Example 1-5 | — | — | — | 91.7 | — | — | — | — | — |
| Example 1-6 | — | — | — | — | — | — | — | — | 91.7 |
| Curing Agent | | | | | | | | | |
| Example 3-1 | 8.3 | 8.3 | 8.3 | 8.3 | — | — | — | — | 8.3 |
| Example 3-2 | — | — | — | — | — | — | — | 33.3 | — |
| Example 3-3 | — | — | — | — | 8.3 | — | — | — | — |
| Example 3-4 | — | — | — | — | — | 8.3 | 8.3 | — | — |
| Example 3-5 | — | — | — | — | — | — | — | — | — |
| Properties | | | | | | | | | |
| Mix Viscosity, cps @ 25° C. | 4,500 | 5,120 | 6,200 | 5,400 | 8,500 | 5,580 | 7,500 | 3,500 | 5,800 |
| Heat Deflection, deg. C | 132 | 124 | 105 | 134 | 142 | 106 | 93 | 52 | 129 |

| Composition, % Weight | J | K | L |
|---|---|---|---|
| Resin Component | | | |
| Example 2-2 | 91.7 | — | — |
| Example 2-3 | — | 91.7 | — |
| Example 2-4 | — | — | 91.7 |
| Curing Agent | | | |
| Example 3-1 | 8.3 | 8.3 | 8.3 |
| Properties | | | |
| Mix Viscosity, cps @ 25° C. | 7,760 | 8,920 | 5,680 |
| Heat Deflection, Deg C. | 120 | 119 | 125 |

The samples for room temperature and heated oil soaks were prepared by saturating 6 mm, 6 denier uncoated polyester felt with the resin/curing agent mix of run 1. The samples for high temperature water soak were made using 3 mm, 6 denier polyester felt coated with polyurethane or Surlyn-nylon films. The samples were prepared in a heated pneumatic press with pressure applied to produce laminates with a resin content of 78 to 82 percent by weight. The samples were cured for one hour at 50° C., one hour at 70° C. and 4.5 hours at 83° C.

After immersing the samples in water or oil they were removed, wiped clean, rinsed with water, air dried for one and one-half hours and weighed. The flexural strength and modulus were determined using ASTM method D-790 at 25° C. on 2×5 inch coupons cut from the composite plaques. The results are shown below.

| | PERCENT WEIGHT GAIN IN WATER | | | |
|---|---|---|---|---|
| WEEKS | 2 | 4 | 8 | 14 |
| Coated with Polyurethane | | | | |
| @ 66° C. | 1.5 | 1.9 | 2.5 | 2.7 |
| @ 93° C. | 2.2 | 3.1 | 4.5* | 6.3* |
| Coated with Surlyn | | | | |
| @ 66° C. | 1.5 | 2.4 | 2.4 | 2.7 |
| @ 93° C. | 2.5 | 3.0 | 3.1 | 3.3 |

*Weight gain due to the polyurethane film degradation

| | PERCENT WEIGHT GAIN | | | | | |
|---|---|---|---|---|---|---|
| WEEKS | 4 | 8 | 12 | 22 | 30 | 52 |
| Kerosene | | | | | | |
| No. 6 Oil | | | | | | |
| @ 25 C... | 1.1 | 1.4 | 1.0 | | | |
| @ 25 C... | 0.7 | 1.1 | 1.1 | | | |
| @ 66 C... | 1.3 | 2.1 | 1.2 | | | |
| @ 93 C... | 1.6 | 1.5 | 1.4 | 0.48 | 0.25 | 0.41 |
| @ 110 to 116 C... | 1.6 | 7.8 | 7.0 | Dark and Warped | | |

| | Flexural Strength, N/mm$^2$ | Flexural Modulus, N/mm$^2$ |
|---|---|---|
| Control Sample | 51.72 | 3199 |
| Samples Immersed 2 Weeks in: | | |
| Kerosene | | |
| No. 6 Oil | | |
| @ 25 C | 49.64 | 3275 |
| @ 25 C | 49.64 | 3275 |

| -continued | | |
|---|---|---|
| @ 66 C | 44.13 | 2820 |
| @ 93 C | 46.20 | 2930 |
| @ 110 to 116 C | 28.27 | 2117 |

As can be seen from Table 4, the compositions A, D, I and L are particularly suitable for use in pipe rehabilitation in which the pipes must carry liquids and gasses at elevated temperatures. They have high heat deflection temperature compared to compositions such as H and also have appropriate mix viscosities.

The laminate of run 1 retained nearly 60% of room temperature physical properties at temperatures of up to 93° C. and withstood heated oil for prolonged periods at this temperature. No significant change in color was observed when the coated laminates were soaked in hot water, and only gained about 3 weight percent at 93° C.

Chemical Resistance of Laminate

The samples for testing chemical resistance were prepared by saturating 6 mm, 6 denier uncoated polyester felt with the resin/curing agent mix of run A from Example 4. The samples were prepared in a heated pneumatic press with pressure applied to produce laminates with a resin content of 78 to 82 percent by weight. The samples were cured for one hour at 50° C., one hour at 70° C. and 4.5 hours at 82° C. 2×5 inch coupons were cut from the composite plaque. After soaking for one year at room temperature (Sample H was soaked for 12 weeks), the samples were removed from the chemical environment, wiped clean, rinsed with water, air dried for one and one-half hours and weighed. Percent weight change was measured. The results of the tests are shown in Table 5.

TABLE 5

| | PERCENT WEIGHT CHANGE AFTER ONE YEAR SOAK | | |
|---|---|---|---|
| | Sample A | Sample G | Sample H* |
| Acetone | 2.2 | 5.5 | 20.8 |
| 20% Acetic acid | 2.0 | 2.4 | 32.4 |
| Toluene | 0.5 | 0.9 | 24.7 |
| 20% Sulfuric | 2.4 | 1.3 | 4.1 |
| Water | 2.0 | 1.5 | 1.5 |
| Clorox | 1.9 | 0.6 | 1.2 |
| 20% NaOH | 1.9 | 0.2 | nil |

*After 12 weeks.

As can be seen from Table 5, sample A had much better overall chemical resistance compared to sample H. For some chemicals, such as acetone, sample A had superior resistance compared to both samples G and H.

We claim:

1. A process for in situ pipe rehabilitation comprising the steps of:
   (a) impregnating a fibrous substrate with a liquid epoxy resin composition comprising (i) at least one liquid epoxy resin having epoxide equivalent weight within the range of about 165 to about 195; (ii) a minor amount, relative to the liquid epoxy resin, of an epoxide functional reactive diluent; (iii) a minor amount, relative to the liquid epoxy resin, of a thixotroping agent; and (iv) an effective amount of a liquid curing agent comprising a polyamide resin, a polyoxyalkylenediamine, and from about 35 to about 55 weight percent, based on the weight of component (iv), of 2-ethyl-4-methyl imidazole or derivatives thereof;
   (b) positioning said resin-impregnated fibrous substrate within a pipe to be rehabilitated so that a surface of the resin-impregnated fibrous substrate is in contact with the interior surface of the pipe; and
   (c) subjecting the thus-positioned resin-impregnated fibrous substrate to conditions effective to cure the liquid epoxy resin.

2. The process in claim 1 wherein the fibrous substrate is a laminate of a fibrous felt and a plastic membrane.

3. The process of claim 1 wherein the liquid epoxy resin is cured by contacting the resin-impregnated fibrous substrate with hot water.

4. The process of claim 1 in which the reactive diluent comprises a diglycidyl ether of a diol.

5. The process of claim 4 in which the reactive diluent comprises a neopentyl glycol.

6. The process of claim 1 in which the reactive diluent comprises a glycidyl ester of a $C_9$–$C_{11}$ tertiary carboxylic acid.

7. The process of claim 1 in which the polyoxyalkylenediamine is a polyoxypropylenediamine having a number average molecular weight within the range of about 350 to about 450.

8. The process of claim 1 in which the viscosity of the epoxy resin composition is within the range of about 25 to about 65 poise at 25° C.

9. The process of claim 1 in which the polyoxyalkylenediamine is present in an amount of from about 30 to about 50 percent by weight based on the polyamide resin and the polyoxyalkylenediamine.

10. The process of claim 1 in which component (iv) comprises a polyamide resin, a polyoxyalkylenediamine and 2-ethyl-4-methyl imidazole.

11. The process of claim 1 in which the liquid epoxy resin is a diglycidyl ether of a dihydric phenol.

12. The process of claim 11 in which the liquid epoxy resin is diglycidyl ether of 2,2-bis(4-hydroxyphenyl)-propane.

* * * * *